United States Patent
Hickey et al.

(10) Patent No.: US 6,430,568 B1
(45) Date of Patent: Aug. 6, 2002

(54) METHODS AND SYSTEMS FOR JAVA INTER-APPLET COMMUNICATION

(75) Inventors: James P. Hickey, Woodland; Zamanah Mowzooni, El Dorado Hills, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/120,945

(22) Filed: Jul. 22, 1998

(51) Int. Cl.$^7$ .............................................. G06F 17/00
(52) U.S. Cl. .............................. 707/103 Z; 707/501.1; 707/103 R
(58) Field of Search .................. 707/1–206, 500.1–542; 710/104; 713/200–201, 323; 709/100–332; 345/473

(56) References Cited

U.S. PATENT DOCUMENTS

| | | | | |
|---|---|---|---|---|
| 5,958,050 A | * | 9/1999 | Griffin et al. | 713/200 |
| 6,108,712 A | * | 8/2000 | Hayes et al. | 709/246 |
| 6,121,981 A | * | 9/2000 | Trower et al. | 345/473 |
| 6,134,616 A | * | 10/2000 | Beatty | 710/104 |

OTHER PUBLICATIONS

Harbaum et al., "Hardware suppoprt for RSVP capable routing", High Performance and routing 2000, pp. 241–249.*

Goldberg et al., "Collaborative teleoperation via the Internet", Robotics and Automation 2000, vol. 2, pp. 2019–2024.*

Delsing et al., "The IP–meter, design concept and example implementation of an INternet enabled power line quality meter", Instrumentation and Measurement Technology Conference 2000, vol. 2, pp. 657–660.* http://gsbjfb.uchicago.edu/javadoc/guide/misc/applet.html, copyrighted 1996.*

Campione et al., The Java Tutorial Second Edition, Object Oriented Programming for the Internet, pp. 12, 118–125, 192–194, Feb. 1998.*

* cited by examiner

*Primary Examiner*—David Jung

(57) ABSTRACT

Methods and systems for inter-applet communication. The methods and systems of the invention are particularly useful for communication between applets in different frames of an HTML page. Java and HTML specifications generally preclude interaction between applets in different HTML pages or frames. The present invention permits such communication by defining a superclass from which all such communicating applets are specialized. The superclass includes static structures and associated methods for enabling communication between the applets specialized therefrom. A static notification list has entries each of which identify a particular applet which requires notification of events from other applets. A first method of the superclass, invoked by a second applet desiring notification of an event, adds (or removes) entries in the notification list. A second method, invoked by a first applet recognizing occurrence of the event, searches the list and notifies all applets having entries registering their interest in events. A third method, an event notification handler overridden by the second applet(s) desiring such notification, is recorded in the notification list entry and invoked by the second method to provide the requisite notification to the second applet. Through notification of occurrence of an event and receipt of such notification, applets specialized from this superclass may effectuate inter-applet communication. Optional parameters passed through the notification registration method, stored in the notification list, and passed to the event notification handler, allows more detailed communication messages.

12 Claims, 3 Drawing Sheets

METHODS AND SYSTEMS FOR JAVA INTER-APPLET COMMUNICATION

BACKGROUND OF THE INVENTION

1. Field of the Invention

The present invention relates to interprocess communication and in particular to Java inter-applet communication for applets in different HTML frames.

2. Discussion of Related Art

In distributed computing environments, processes communicate with one another using various inter-process communication (IPC) standards. Processes, as used herein, refers to both user processes (application programs) and system processes. IPC communication standards generally utilize a technique referred to as "sockets" to communicate between cooperating processes. A first process establishes a socket by identifying the protocols to be used and the destination process with which it wishes to communicate. The second process also establishes a socket identifying the protocol supported for communicating with other processes. The second process then listens for another process to establish communications directed to its (the second process) address.

Java is a computer programming language recently gaining popularity for development of portable application programs. Java is an interpreted computer programming language. An interpreted computer programming language is one which does not directly translate into binary executable code. Rather, the source language (or an intermediate binary representation thereof) is processed by a program, an interpreter, which performs appropriate functions to implement the high-level source language statement. Interpreted languages such as Java are therefore often restricted in their functionality. Such restrictions are often considered desirable to enhance security measures within a system.

In particular, Java is frequently used for implementing so-called applets operable in the World Wide Web/Internet distributed computing environments. In such environments, a Web browser (client) downloads information from an identified Web server. The information, typically referred to as a page, may include Java applets to be downloaded to the Web browser. The Web browser includes a Java language interpreter which then interprets the downloaded applets to perform the desired task.

The Java specification generally precludes objects such as Java applets within one "page" from communicating with objects in a second "page". Further, in the Java specification, a single displayed screen in the users Web browser may include a number of frames (distinct sections of information displayed for the user). A frame is generally considered the equivalent of a page with regard to the security measures of the Java specification which preclude objects communicating between pages or frames. It is therefore a problem in the Java language to communicate between applets.

Though applets in different frames in the Java language are not generally permitted to communicate with other applets using IPC sockets, they are permitted to communicate with processes on the server from which the Java applets were loaded. One solution to the inter-applet communication problems noted above has been for applets desiring communication to use a particular messenger service on the server from which the applets were loaded. Each applet is able to communicate with the messenger service on the server from which they were loaded. Therefore, the applets may communicate with one another via the messenger service as an intermediary.

This solution is incomplete and cumbersome. Furthermore, evolving standards in the Java language specification may preclude such communication links even with the server processes. First, the prior solutions are cumbersome in that both applets must communicate with the server process to effectuate their inter-applet communications. This utilizes valuable bandwidth where the communication links are slow or otherwise limited. The solutions are incomplete in the sense that only applets downloaded from a common server may communicate using these prior techniques.

Another prior solution has been to utilize the Javascript language as in intermediary between two applets desiring to communicate. The Java applets invoke functions in Javascript to effectuate other desired inter-applet communication. However, this solution is not standardized and may be supported only on the Netscape Communicator product. Older Web browsers and Microsoft Internet Explorer are incapable of implementing the solution.

It is evident from the above discussion that a need exists for improved inter-applet communications in the Java programming language.

SUMMARY OF THE INVENTION

The present invention solved the above and other problems, thereby advancing the state of the useful arts, by providing and inter-applet communication capability which is portable to a number of Web browsers, within standard Java language specifications, and less cumbersome in use of bandwidth than prior solutions. In particular, the present invention provides for defining a superclass common to all applets needing to communicate with each other. All applets desiring to so communicate are defined as subclasses of the superclass. The superclass has static variables defined therein and methods for notifying applets of changes in those static variables. The static variables are therefore useful for inter-applet communication purposes.

As compared to prior techniques no communication bandwidth need be utilized to communicate between applets in different frames of a Web browser. More specifically, a server based messenger process is not required for inter-applet communications in accordance with the present invention. Further, defining applets in accordance with the superclass of the present invention is within the standards prescribed for the Java programming language. The present invention is therefore more portable to a variety of Java implementations and associated Web browsers as compared to prior techniques.

DETAILED DESCRIPTION OF THE PREFERRED EMBODIMENTS

Figure 1:
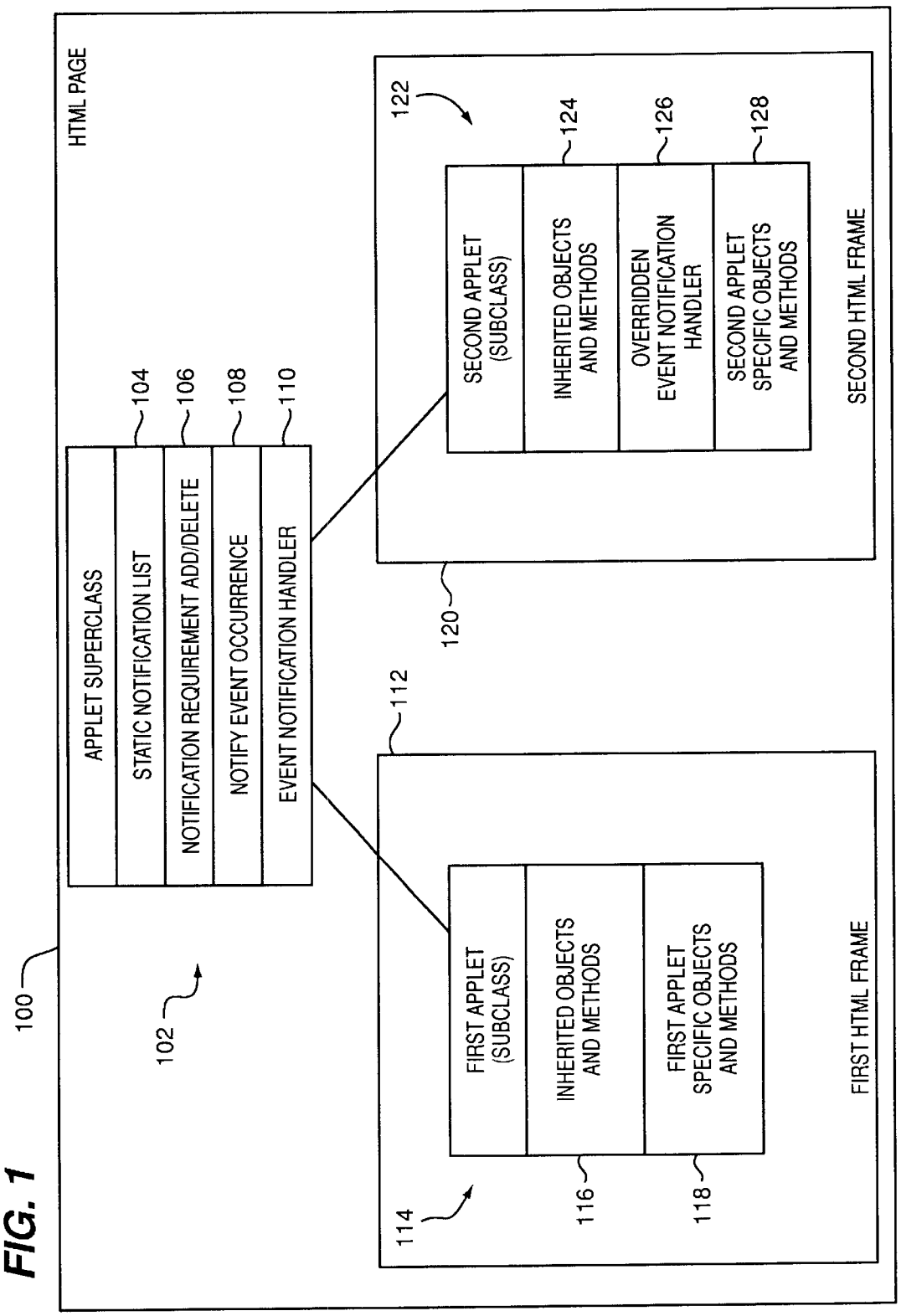
FIG. 1 is a block diagram of the superclass and applet subclasses of the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram depicting class and object relationships associated with the methods and structures of the present invention. Within HTML page 100 the present invention defines a Java applet superclass 102. All Java applets requiring inter-applet communication are derived from (specializations of) superclass 102. Included within applet superclass 102 is a static notification list structure 104 used as described herein below to register applets requiring notification of particular event occurrences. At least three methods, 106, 108 and 110, are also defined within applet superclass 102. The first method 106 provides for addition and deletion of entries in the notification list 104. In the preferred embodiments, method 106 is actually subdivided into two distinct methods, a first method for adding entries to the notification list and a second method for deleting entries from the notification list. To simplify the description herein, a single method 106 is presented for both purposes. A second method 108 enables notification of the occurrence of a particular event. As discussed further herein below, this method is invoked by one applet to signal occurrence of particular events to other applets which have registered their interest in the notification list 104. Applets register such notification by invocation of the first method 106. The third method 110 provides for actual processing associated with a particular applet in response to notification of the occurrence of particular event. In superclass 102, this third method 110 provides a function intended to be overridden by a function within an applet instance. The overriding method within a specific applet instance performs the actual processing required when notification is received of the occurrence of a particular event.

As noted above, Java and HTML specifications preclude applets within different frames of an HTML page from directly communicating with one another. Without the methods and structures of the present invention, an applet operable in a first HTML frame 112 and another applet operable and second HTML frame 120 would be incapable of inter-applet communication. In accordance with the present invention, first applet 114 is a specialization of (derived from) applet superclass 102. In other words, it is a subclass of applet superclass 102. First applet 114 therefore inherits objects and methods 116 defined by applet superclass 102. The inherited objects and methods 116 comprise static notification list structure 104 and methods 106, 108 and 110. First applet 114 further comprises applet specific objects and methods 118 which perform the particular processing for which first applet 114 is designed within the first HTML frame 112.

In like manner, second applet 122 is a specialization of (derived from) applet superclass 102. As a derived subclass, second applet 122 inherits objects and methods 104 through 110 as inherited objects and methods 124. In particular, second applet 122 includes an overridden event notification handler method 126 which overrides the inherited method 110. As depicted in FIG. 1, second applet 122 is therefore intended to receive notification of the occurrence of events from information generated by a first applet 114. For this reason second applet 122 includes the overridden event notification handler method 126. In like manner to first applet 114, second applet 122 further comprises applet specific objects and methods 128 for performing the specific processing within the second HTML frame 122.

As shown in FIG. 1, first applet 114 is intended to generate information (event occurrence notifications) and communicate such notifications to second applet 122 using the static features and associated methods of applet superclass 102. Those skilled in the art will recognize that first applet 114 may also include an overriding event notification handler method to permit bi-directional communications (i.e., event notification directed from second applet 122 back to first applet 114). Further, those skilled in the art will recognize that any number of additional applets operable within any number of additional HTML frames may receive event notification messages from the event notification generating applet.

Figure 2:
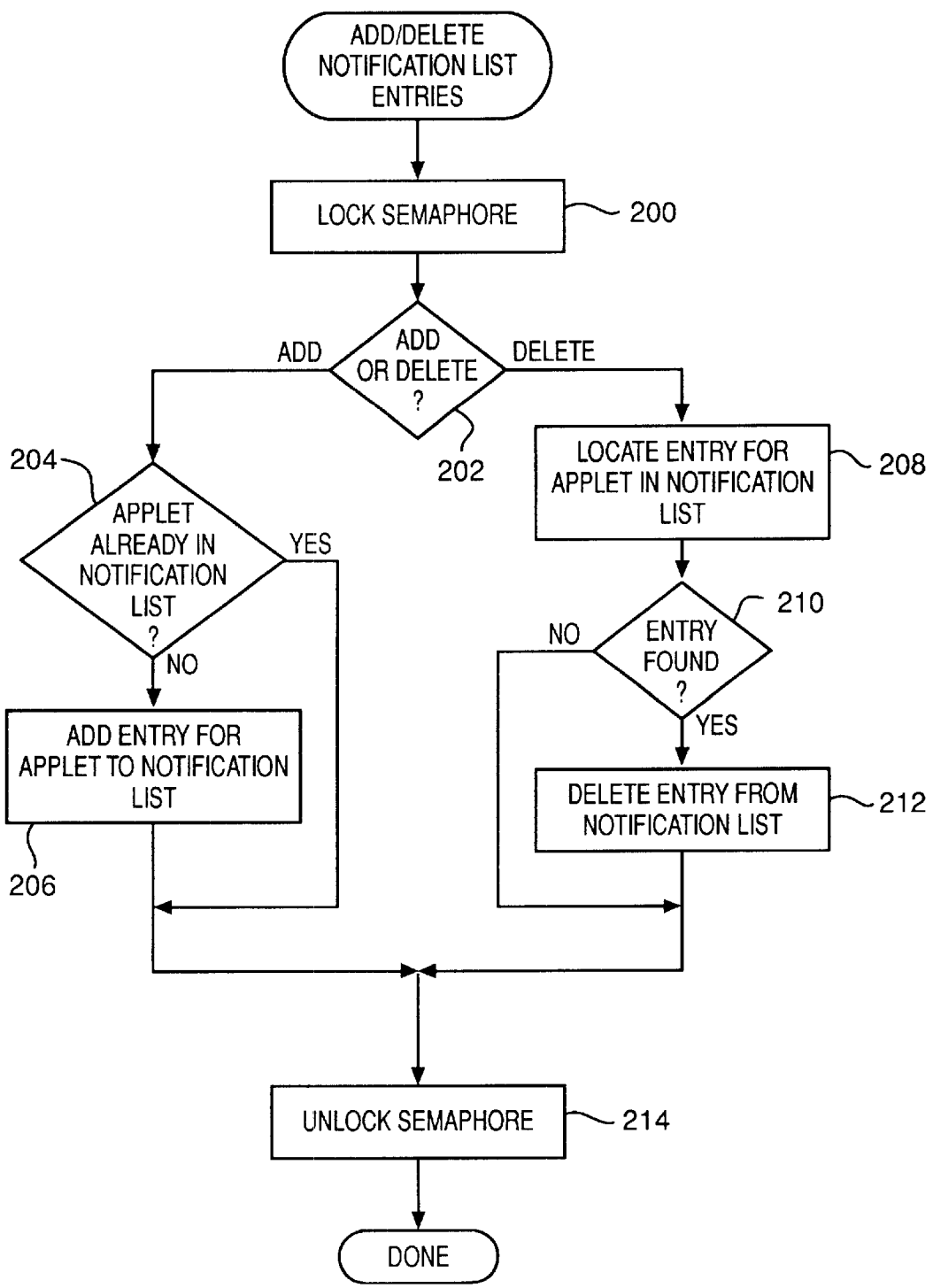
FIG. 2 is a flowchart describing a first method of the applet superclass of the present invention.

FIG. 2 is a flow chart describing the method (106 of FIG. 1) of the present invention for adding or deleting entries to the static notification list 104 of FIG. 1. Element 200 is first operable to lock a semaphore to assure mutual exclusivity for multiple applets attempting to manipulate the static notification list simultaneously. Element 202 is next operable to determine whether the invocation of the method has requested the addition or deletion of an entry in the notification list. If addition of an entry to the notification list is requested, element 204 is next operable to determine if the requesting applet (provided as a parameter to the method) is already present in the notification list. If no such entry is found in the notification list, element 206 is next operable to add an entry corresponding to the requesting applet to the notification list. In both cases, processing continues with element 214 to complete the method by unlocking the previously locked semaphore.

Element 204 is optional in that, depending upon the application of the communication system of the present invention, it may be unnecessary to check the list. Applets could be designed to assure that they would register once and only once. Therefore the need to check whether the applet is already in the list is obviated. However, those skilled in the art will recognize that the method as depicted in FIG. 2 with the optional test of element 204 may be appropriate in certain applet instances. Such design choices are well known to those skilled in the art.

Elements 208 through 212 are operable in response to a determination by element 202 that the invocation of the method requests deletion of an entry from the notification list. Element 208 is first operable to locate an entry in the notification list corresponding to the requesting applet (provided as a parameter to the method invocation). Element 210 is then operable to determine if such an entry was found by operation of element 208. If such an entry is located, element 212 is next operable to delete the located entry from the notification list. In either case, processing then continues with element 214 to complete processing of the method by unlocking the previously locked semaphore.

As noted above, the method of FIG. 2 is described as a single method which effectuates processing for both addition and deletion of entries in the notification list. Addition and deletion of entries may also be implemented as two separate methods as in the preferred embodiment and best presently known mode of practicing the invention described herein below. A first method for adding entries to the list and a second method for deleting entries from list. Furthermore, those skilled in the art will readily recognize that the notification list may be implemented using any of several well-known data structures and programming techniques. For example, the notification list may be a simple array into which entries are added and deleted as described herein below. Or, for example, the notification list may be implemented as a linked list structure or queue in which entries are added by linking them into the list and deleted by unlinking them from the list. Many other equivalent data structures will be recognized by those skilled in the art.

An applet which has a corresponding entry in the notification list is referred to herein as registered. Adding an entry is therefore also referred to as registering while deleting an entry is also referred to as unregistering the applet.

Figure 3:
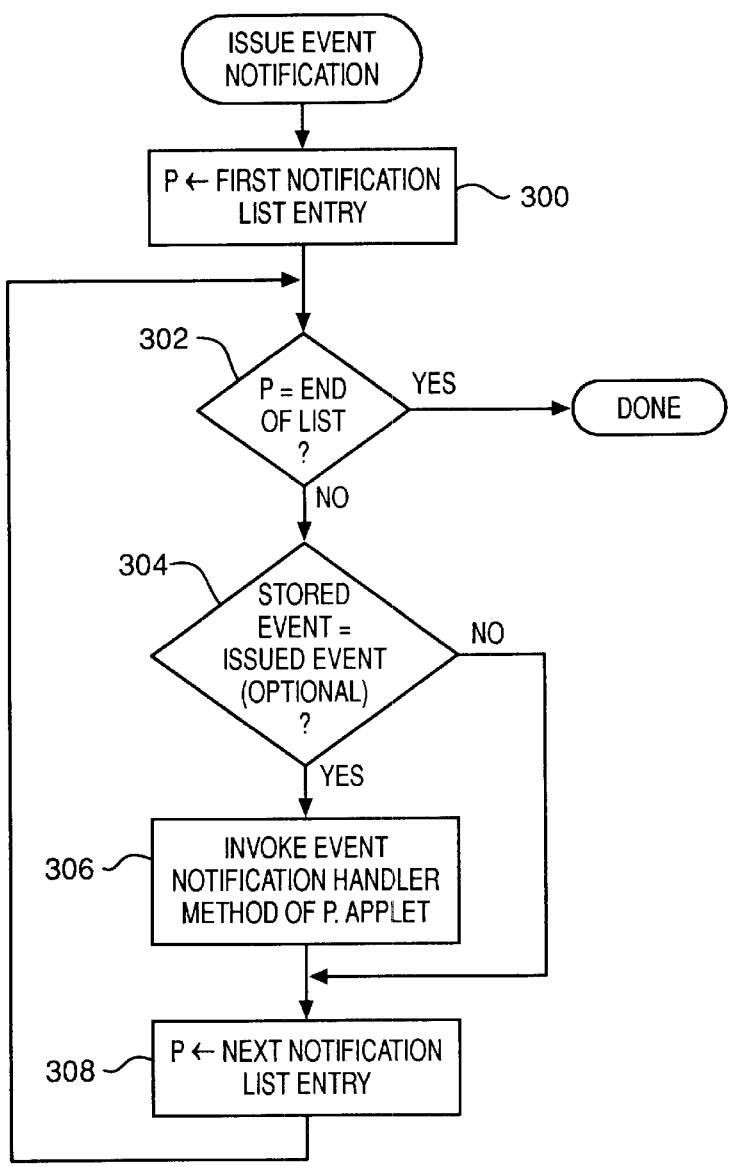
FIG. 3 is a flowchart describing a second method of the applet superclass of the present invention.

FIG. 3 is a flow chart describing operation of a method 108 invoked to provide notification of the occurrence of a particular event. Element 300 is first operable to set a local pointer variable or other index to the first notification list entry. Elements 302 through 308 are then operable iteratively to process each entry in the notification list. Element 302 is operable to determine whether the local pointer variable indicates that it is presently pointing at the end of the list. If so, processing of the method is completed. If not, processing continues with element 304.

Element 304 is then operable to determine whether the particular event supplied as a parameter to the method invocation matches and event identification stored in the entry of the notification list. As noted in FIG. 3, this processing step is optional in that the processing may simply provide notification to all registered applets of all events for which notification generated. The optional processing of element 304 therefore permits filtering of the notification process to provide the information only to those registered applets seeking notification of the particular event for which notification has been generated. If the optional processing element 304 determines that the stored event in the notification list entry is not to the same as the event for which notification has been generated, processing continues with element 308 described below. If the two events are the same, element 306 is next operable to invoke the event notification handler method of the applet identified in the current notification list entry.

In the best presently known mode of practicing the invention, as discussed further below, the optional processing of element 304 is not deemed necessary. In other words, in the best presently known mode of practicing the invention all registered applets are notified of any event. The event handler method of the applets then determines which events it wishes to process further and which are of no interest. Those skilled in the art will recognize the benefit of the optional processing of element 304 where the number of communicating applets is large or where the number of different event types is large. In such applications, it may be preferred that the communication system allow filtering of event messages as noted in element 304 of FIG. 3. Such design choices are well known to those skilled in the art.

Element 308 is then operable to move the local pointer variable or other index to the next notification list entry. Processing then continues by moving back to element 302 to determine if more entries remain to be processed.

Figure 4:
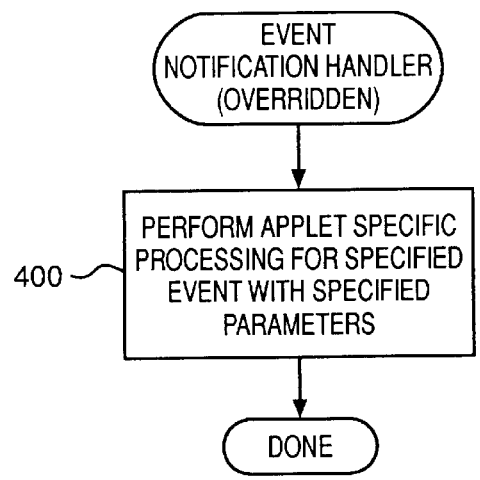
FIG. 4 is a flowchart describing a third method of the applet subclass overriding the nominal third method defined by the applet superclass in accordance with the present invention.

FIG. 4 is a flow chart describing operation of an exemplary event notification handler method 110 (as overridden in the second applet 122 by method 126). The method of FIG. 4 generally describes the processing by element 400 as specifically required for a particular applet when notification is received of the occurrence of a particular event. As noted above, the particular event and a parameter associated with the event are provided to the invocation of the method of FIG. 4 as parameters.

As noted above, the particular event may or may no be of interest to the applet. The event handler method therefore performs any tests and filtering appropriate to the applet to determine which events are relevant to the particular applet. Relevant event notifications are processed in the applet (by the event handler method) and irrelevant events are simply ignored. Such design considerations are specific to the particular application of the applets and the inter-applet communication system of the present invention and are well known to those skilled in the art.

The methods of the present invention may be further understood with reference to the following Java applet sample code. In particular, the Java applet sample code described below represents the best presently known mode for practicing the invention. Those skilled in the art or recognize a wide variety of equivalent code and data structure implementations which achieve the same purpose and provide similar functionality. The Java applet sample code herein below is therefore not intended to limit the scope of the invention but rather is supplied to provide an exemplary implementation of the features of the present invention.

```
//
// Exemplary JDApplet superclass definition.
//
// the list of applets interested in Internal Event notification
// as noted above, the NotificationList may be a structure
   whose nodes (entries)
// include storage of a particular event for which notification
   is requested and
// a stored parameter to be returned to the event notification
   handler. such design
// choices are well known to those skilled in the art. the
   presently best known
// mode stores only a reference to the applet which will
   receive notification all
// events for which notification is generated. static protected
   JDApplet NotificationList[ ]=new JDApplet(100);
// the number of entries in NotificationList static protected
   int intAppletlx;
//
// add the passed JDApplet to the list of applets to be notified
   when ANY
// Internal Event occurs
//
protected void RegisterForNotify(JDApplet a)
{
  try{
    // make sure only one task is doing this at a time
    synchronized (Class.forName("JDApplet")){
      for (int i=0; i<intAppletlx; i++){
        // as noted above, if desired for particular appli-
           cations
        // the list may optionally be searched to determine
        // if the applet is already in the list. in the best
        // presently known mode of practicing the inven-
           tion
        // it is not necessary to so check the list.
        // if (NotificationList[ i ]==null){
          // re-use an empty entry
          NotificationList[i] =a;
          a.notifylx=i;
          return;
        }
      }
      // no empty entries add it
      a.notifylx—intAppletlx;
      NotificationList[intAppletlx++]=a;
    }
  }catch (ClassNotFoundException a){ }
}
//
```

```
// remove the passed JDApplet from the NotificationList
//
protected void UnRegisterForNotify(JDApplet a)
{
  try{
    // make sure only one applet does this at a time
    synchronized (Class.forName("JDApplet")){
      for (int i=0; i<intappletlx; i++){
        if (NotificationList[i]==a){
          NotificationList[i]=null;
          return;
        }
      }
    ]catch (ClassNotFoundException a){ }
}
//
// notify all interested applets that the specified
// Internal Event has occurred
//
public void notifyInternalEvent (int event, int parm)
int=0;
  try{
    for (i=0; i <intappletlx; i++){
      if (NotificationList[i] !=null){
        NotificationList[i]. InternalEvent(event,
          parm);
      }
    }
  } catch (Exception a){ }
}
//
// dummy event notification handler method to be overridden
// by actual applet interested in notification of events
//
public void InternalEvent (int event, int parm)
{
}
```

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A system for Java inter-applet communication comprising:
   a superclass having at least one static variable defined therein;
   a first applet operable in a first frame of an HTML page, said first applet instantiated as a subclass of said superclass wherein said first applet transmits information via said at least one static variable; and
   a second applet object operable in a second frame of said HTML page, said second applet instantiated as a subclass of said superclass wherein said second applet receives said information via said at least one static variable to effectuate communication between said first applet and said second applet,
   wherein said at least one static variable includes:
   a notification list having entries each entry of which identifies an instance of said second applet as requiring notification of occurrence of a corresponding event.

2. The system of claim 1 wherein each entry of said notification list entries further includes:
   an event handling method wherein said event notification method is defined in said superclass and overridden by said second applet object; and
   a parameter passed to said event notification method when invoked wherein said parameter has a value supplied by said second applet.

3. The system of claim 1 wherein said superclass includes:
   an event notification method invoked by said first applet to indicate occurrence of a particular event.

4. The system of claim 3 wherein said event notification method includes:
   means for locating matching entries in said notification list wherein said matching entries are entries identifying a corresponding even identical to said particular event.

5. A system for inter-applet communication comprising:
   a superclass including inter-applet communication means;
   a first applet operable in a first frame of an HTML page wherein said first applet is instantiated as a subclass of said superclass; and
   a second applet operable in a second frame of said HTML page wherein said second applet is instantiated as a subclass of said superclass and wherein said first applet and said second applet communicate via said inter-applet communication means,
   wherein said inter-applet communication means includes:
   a first method of said superclass which when invoked by said second applet registers a requirement by said second applet that it be notified of occurrence of an identified event; and
   a second method of said superclass which when invoked by said first applet notifies said second applet of the occurrence of said particular event.

6. The system of claim 5 wherein said communication means further includes:
   a static notification list having entries each entry of which identifies an instance of said second applet as requiring notification of occurrence of a corresponding particular event,
   wherein said first method is operable to add an entry to said notification list identifying said second applet as requiring notification of occurrence of said particular event.

7. The system of claim 6 wherein said second method is operable to locate entries in said static notification list identifying said particular event.

8. The system of claim 7
   wherein said superclass further includes a third method invoked by said first applet for receiving notification of the occurrence of said particular event within said second applet, wherein said second applet overrides said third method with a unique third method for receiving notice of occurrence of said particular event, and
   wherein each entry of said entries includes a reference to said unique third method of said second applet for which notification requirement is registered, and
   wherein said second method includes means for invoking said unique third method identified in the located entries identifying said particular event.

9. A method for communicating between a first applet operable in a first frame of an HTML page and a second applet operable in a second frame of the same HTML page comprising the steps of:
   providing a superclass having inter-applet communication means associated therewith;

specializing said first applet from said superclass;

specializing said second applet from said superclass; and exchanging information between said first applet and said second applet via said inter-applet communication means of said superclass, wherein exchanging information further comprises:

invoking a first method of said superclass by said second applet to register a requirement by said second applet that it be notified of occurrence of a particular event; and invoking a second method of said superclass by said first applet to notify said second applet of the occurrence of said particular event.

10. The method of claim 9 wherein said communication means further includes a static notification list having entries each entry of which identifies an instance of said second applet as requiring notification of occurrence of a corresponding particular event, wherein invocation of said first method includes the step of:

adding an entry to said notification list identifying said second applet as requiring notification of occurrence of said particular event.

11. The method of claim 10 wherein invocation of said second method includes the step of:

locating entries in said static notification list identifying said particular event.

12. The method of claim 11 further comprising the step of:

invoking a third method of said superclass by said first applet for receiving notification of the occurrence of said particular event by said second applet, wherein said second applet overrides said third method with a unique third method for receiving notice of occurrence of said particular event, and wherein each entry of said entries includes a reference to said unique third method of said second applet for which notification requirement is registered.

* * * * *